United States Patent Office 3,793,349
Patented Feb. 19, 1974

3,793,349
QUINIZARIN-4-AMINOPHENOXY ACETAMIDES
Grannis S. Johnson, Thornton, Pa., and John H. Shown, Castleton on Hudson, N.Y., assignors to GAF Corporation, New York, N.Y.
No Drawing. Filed June 1, 1972, Ser. No. 258,670
Int. Cl. C09b 1/50
U.S. Cl. 260—377
8 Claims

ABSTRACT OF THE DISCLOSURE

Blue color dyes particularly useful for dyeing polyester fibers comprising quinizarin-4-aminophenoxy acetamides, methods of preparing and using the same.

This invention relates to novel blue dyes particularly adapted for use in dyeing polyester fibers. More particularly this invention relates to the reduction products of quinizarin-4-aminophenoxy acetamides and constitute dyes particularly suitable for the dyeing of polyester fibers.

In accordance with the invention, it has now been found that quinizarin-4-aminophenoxy acetamides having the following formula:

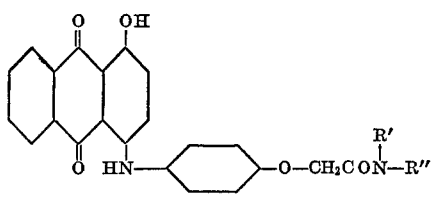

wherein R' is hydrogen, lower alkyl such as methyl, ethyl, propyl, isopropyl, butyl, isobutyl, pentyl, hexyl and the like or hydroxy alkyl such as hydroxy ethyl, hydroxy propyl, hydroxy butyl and the like and R" is hydrogen or lower alkyl as above set out constitute improved polyester fiber and textile dyestuffs.

A particularly preferred group of compounds are those having the formula as above set out, wherein R' is hydrogen, methyl, ethyl, n-butyl or hydroxy ethyl and R" is hydrogen, methyl or ethyl.

Illustrative of compounds corresponding to the above formula which have proved particularly suitable as dyes for polyester fibers, fabrics and textiles are the following:

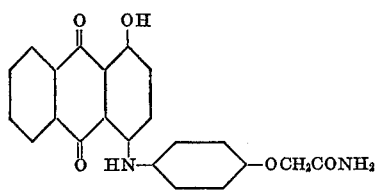

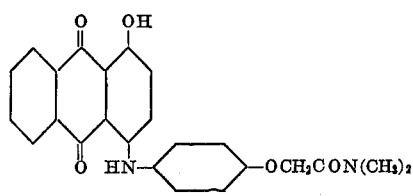

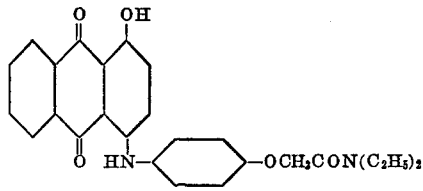

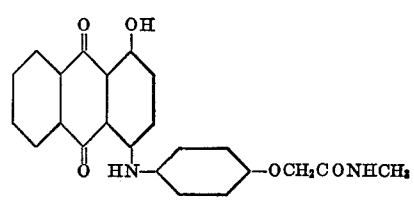

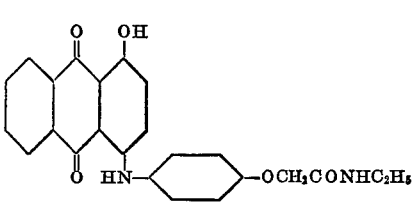

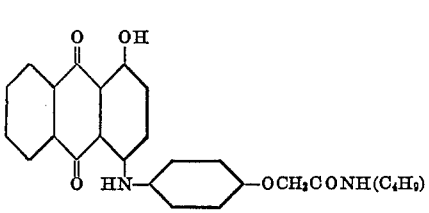

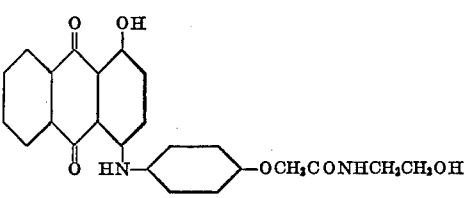

The above compounds, as well as all of the compounds coming within the above set out formulae are useful as dyes for polyester fibers. They can be applied to either the fibers, textiles or fabrics prepared therefrom by the conventional dyeing methods. Thus, for example, the Thermasol method may be used for applying dyes to polyester fabrics and woven materials while the conventional batch dyeing procedure may be used for dyeing the polyester fibers or yarns per se. The dyed fibers, yarns, fabrics and other woven and non-woven materials possess excellent light fastness, excellent sublimation fastness and in general exhibit minimal crocking from batch dyed skeins.

The novel dyes in accordance with the invention can be prepared by reacting quinizarin with a 4-aminophenoxy acetamide under conditions whereby only one hydroxyl group of the quinizarin is displaced by an aryl amino group.

Quinizarin or 1,4-dihydroxy anthraquinone is a known material and can be prepared, for example, by heating p-chlorophenol, phthalic anhydride and either sulfuric acid or aluminum chloride to form the desired product. It is also possible to employ as starting material for preparing the quinizarin hydroquinone.

The 4-aminophenoxy acetamides starting material is for example prepared using readily available materials in two steps according to the following reaction scheme:

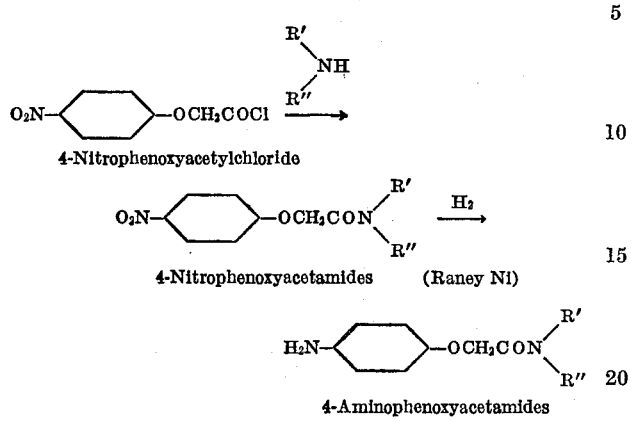

The following examples are given in order to more fully illustrate the invention. The examples, however, are not to be considered in any way as limiting the scope thereof.

EXAMPLE 1

N,N-dimethyl-2-(4-nitrophenoxy)acetamide

A slurry is prepared from 50 g. 4-nitrophenoxyacetyl chloride in 300 ml. water. 60 g. of a 40% dimethylamine solution is introduced into the resultant solution in dropwise fashion. The reaction product thus formed is separated off by filtering, washed with water until neutral and dried in an oven at 90° C. The yield of acetamide amounts to 37 g. The melting point of the recovered product is 125° C. Calculated (percent): N—12.6. Found (percent): N—12.1.

N,N-dimethyl-2-(4-nitrophenoxy)acetamide is a novel material not heretofore available.

EXAMPLE 2

N,N-dimethyl-2-(4-aminophenoxy)acetamide

A solution of 164 g. of N,N-dimethyl-2-(4-nitrophenoxy) acetamide in 100 ml. methanol was prepared. 10 g. Davison sponge nickel catalyst was introduced into the resultant solution and the mixture introduced into an autoclave provided with a stirrer. Hydrogenation was carried out in the autoclave at 50 p.s.i.g. at a temperature of 75° C. until no further hydrogen was absorbed. The autoclave was opened, the reaction product cooled to 30° C. and the catalyst filtered off. The filtrate was then evaporated to dryness. The yield of N,N-dimethyl-2-(4-aminophenoxy) acetamide following recrystallization from benzene amounted to 120 g. (86% of theory). The reaction product had a melting point of 130–131.5° C. Calculated (percent): N—14.4. Found (percent): N—14.0.

The above compound is novel and has not been previously described.

EXAMPLE 3

N,N-diethyl-2-(4-nitrophenoxy)acetamide

A slurry of 50 g. 4-nitrophenoxy acetyl chloride in 300 ml. of water was prepared. Thereafter, 50 g. diethylamine was added in dropwise fashion. The solid reaction product was filtered off and washed with water. Following air drying, the reaction product comprising white crystals was recovered in an amount of 39.5 g. (67% of theory). The melting point of the reaction product amounted to 70–75° C. Calculated (percent): N—11.1. Found (percent): N—10.9.

This compound has not previously been described in the literature.

EXAMPLE 4

N,N-diethyl-2-(4-aminophenoxy)acetamide

There were introduced into an autoclave, provided with a stirrer, 38 g. N,N-diethyl-2-(4-nitrophenoxy)acetamide, 300 ml. ethanol and 5 g. Davison sponge nickel catalyst. The autoclave was heated and hydrogenation of the reaction mixture carried out at 75° C. and 50 p.s.i.g. until no further uptake of hydrogen occurred. The catalyst was filtered off and the remaining filtrate evaporated to dryness. The yield of low melting solid reaction product thus recovered amounted to 31 g. (93% of theory). This compound has not heretofore been described in the literature.

EXAMPLE 5

N-methyl-2-(4-nitrophenoxy)acetamide

A slurry of 50 g. 4-nitrophenoxyacetyl chloride in 300 ml. of water was prepared. There was then added 40 g. 40% methyl amine solution in dropwise fashion with cooling. The reaction product thus formed was filtered off, washed until neutral with water and dried in air. Yield of white crystal reaction product having a melting point of 164.5–165.5 amounted to 44 g. (90% of theory). Calculated (percent): N—13.3. Found (percent): N—13.6

EXAMPLE 6

N-methyl-2-(4-aminophenoxy)acetamide 300 ml. ethanol, 5 g. Davison sponge nickel catalyst and 43 g. N-methyl-2-(4-nitrophenoxy)acetamide were introduced into a stirrer autoclave.

The reaction mixture was then hydrogenated at 80° C. and 50 p.s.i.g. until all uptake of hydrogenation had ceased. The reaction mixture was cooled, the catalyst filtered off and the filtrate evaporated to dryness. There were obtained 35 g. (90% of theory) of a reaction product having a melting point of 108–109. Calculated (percent): N—15.0. Found (percent): N—15.2.

EXAMPLE 7

N-ethyl-2-(4-nitrophenoxy)acetamide 142 g. 4-nitrophenoxyacetyl chloride were dissolved in 650 ml. chlorobenzene and there was added in dropwise fashion to this solution at 20–30° C. 175 ml. 70% ethyl amine solution. The reaction mixture was stirred while maintaining the temperature at 130° C. for one half hour. The solid reaction product which formed was filtered off, washed with a small amount of chlorobenzene and dried in an oven at 95° C. The yield of acetamide product amounted to 152.6 g. (68% of theory) and had a melting point of 140–141° C. This product is new and has not previously been described.

EXAMPLE 8

N-ethyl-2-(4-aminophenoxy)acetamide 1000 ml. methanol, 152.6 g. N-ethyl-2-(4-nitrophenoxy) acetamide and 10 g. Davison sponge nickel catalyst were introduced into an autoclave. Hydrogenation of the reaction mixture was carried out under stirring at 50 p.s.i.g. and 75° C. The reaction was completed when no further hydrogen uptake occurred. The reaction mixture was then cooled and the catalyst separated off by filtering. The yield of N-ethyl-2-(4-aminphenoxy) acetamide obtained following evaporation of the filtrate and recrystallization from benzene amounted to 124 g. (94.5% of theory).

EXAMPLE 9

N-butyl-2-(4-nitrophenoxy)acetamide

A slurry was prepared by introducing 50 g. of 4-nitrophenoxy acetyl chloride into 300 ml. of water. There were then introduced dropwise with cooling 40 g. of butylamine. When the addition had been completed, the solid product formed was filtered off and allowed to air dry. The yield of acetamide thereby obtained (51% of theory) amounted to 30 g. and had a melting point of 82–83° C. Calculated (percent): N—11.1. Found (percent): N—11.1.

EXAMPLE 10

N-butyl-2-(4-aminophenoxy)acetamide

There were introduced into an autoclave provided with a stirrer 300 ml. ethanol, 29 g. N-butyl-2-(4-nitrophenoxy) acetamide and 5 g. Davison sponge nickel catalyst. Hydrogen was introduced into the autoclave and the hydrogenation reaction carried out at 75° C. and 50 p.s.i.g. until all uptake of hydrogen had ceased. The autoclave was opened, the contents removed and the catalyst filtered off. The filtered product was then evaporated to dryness. The yield of low melting solid amounted to 24 g. (94% of theory). Calculated (percent): N—12.6. Found (percent): N—12.0.

EXAMPLE 11

N-(2-hydroxyethyl) 2-(4-ntrophenoxy)acetamide

A slurry was prepared from 50 g. 4-nitrophenoxyacetyl chloride in 300 ml. of water. 35 g. monoethanolamine were added dropwise to the slurry with cooling. The solid product thus obtained was filtered off and dried in air. The yeild amounted to 46 g. (82% of theory) and had a melting point of 147° C. Calculated (percent): N—11.7. Found (percent): N—12.0.

EXAMPLE 12

N-(2-hydroxyethyl) 2-(4-aminophenoxy)acetamide

There were introduced into an autoclave provided with a stirrer 45 g. N-(2-hydroxyethyl) 2 - (4- nitrophenoxy) acetamide 300 ml. ethanol and 5 g. Davison sponge nickel catalyst. The reaction mixture was hydrogenated at 75° C. and 50 p.s.i.g. until all hydrogen uptake had ceased. The catalyst was filtered off then evaporated to dryness. The yield of product amounted to 37 g. (94% of theory) and had a melting point of 75–77° C.

The dyestuffs in accordance with the invention were prepared by reacting the acetamide with quinizarin in accordance with the following reaction scheme:

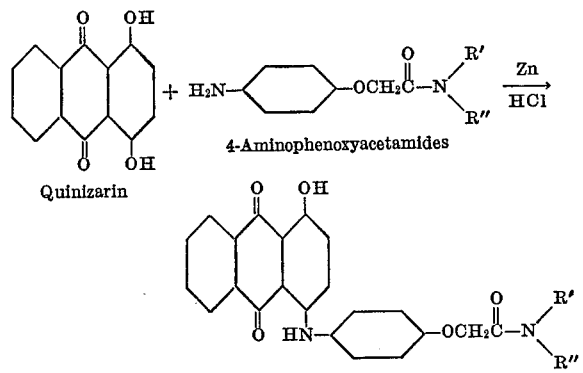

wherein R' is hydrogen, lower alkyl or hydroxy lower-alkyl and R" is hydrogen or lower alkyl.

EXAMPLE 13

4-aminophenoxyacetamide 200 ml. butanol, 24 g. quinizarin, 10 g. boric acid, 18 g. 4-aminophenoxyacetamide and 1.0 g. zinc dust were mixed together and the mixture heated to 50° C. 3 ml. 36% hydrochloric acid were then added and the mixture heated at reflux (105° C.) for 7½ hours. The mixture was then cooled down to 30° C. and the solid product recovered by filtration. The solid material was washed with isopropanol and reslurried in 1% NaOH solution. Thereafter, the slurry was subjected to filtering and the solid material recovered and washed until neutral. The yield of blue dyestuff amounted to 34.5 g. The dyestuff exhibited good build-up on Dacron when either the Thermasol process or batch dyeing procedure was followed. The light fastness and sublimation fastness properties were very good.

EXAMPLE 14

N,N-dimethyl-2-(4-aminophenoxy)acetamide

A mixture was prepared from 200 ml. butanol, 18 g. quinizarin, 8 g. boric acid, 16 g. N,N-dimethyl-2-(4-aminophenoxy)acetamide and 1.0 g. zinc dust. This mixture was heated to 50° C. and then 3 ml. of 36% HCl were added. The acidified mixture was heated at reflux until the reaction had gone to completion. The reaction mixture was cooled to 30° C. and filtered. The solid filter cake covered was reslurried in 1% NaOH, refiltered and washed until neutral. After drying in the oven at 95° C., 24 g. of a blue dyestuff exhibiting excellent build-up on Dacron with either batch dyeing or Thermasol processing, the light fastness and sublimation fastness were good.

EXAMPLE 15

N,N-diethyl-2-(4-aminophenoxy)acetamide

A mixture was prepared from 200 ml. butanol, 24 g. quinizarin, 10 g. boric acid, 24 g. N,N-diethyl-2-(4-aminophenoxy)acetamide and 1 g. of zinc dust. The mixture was heated to 50° C. and then 3 ml. 36% HCl were added. The acidified mixture was refluxed until the reaction was completed. The mixture was cooled to 33° C. and filtered. The recovered filter cake was reslurried in 1% NaOH, the resultant slurry filtered and the cake washed until free of NaOH. The solid product was then dried in air. 36.5 g. of a blue dyestuff were recovered which exhibited good build-up on Dacron when applied by the Thermasol process or by batch dyeing. The fastness to light and sublimation were good.

EXAMPLE 16

N-methyl-2-(4-aminophenoxy)acetamide

The procedure of Example 15 was repeated except that 20 g. N-methyl-2-(4-aminophenoxy)acetamide was employed in place of the corresponding diethyl compound. The yield of the blue dyestuff obtained amounted to 11 g. The dyestuff exhibited very good build-up on Dacron in batch dyeing with minimal crocking from the dyed skeins. The light fastness and sublimation fastness were good.

EXAMPLE 17

N-ethyl-2-(4-aminophenoxy)acetamide

The procedure of Example 15 was repeated but in place of the diethyl substituted acetamide 21 g. of N-ethyl-2-(4-aminophenoxy)acetamide were used. 20 g. of a blue dyestuff were obtained exhibiting excellent build-up Dacron in batch dyeing. The product exhibited minimal crocking from batch dyed sections, excellent fastness to light and sublimation.

EXAMPLE 18

N-butyl-2-(4-aminophenoxy)acetamide

The procedure of Example 14 was repeated using 18 g. N-butyl-2-(4-aminophenoxy)acetamide. There were obtained 19 g. of the blue dyestuff which exhibited good build-up on Dacron. Dyed sections exhibited minimal crocking and good light fastness and sublimation fastness.

EXAMPLE 19

N-(2-hydroxyethyl) 2-(4-aminophenoxy)acetamide

The procedure of Example 15 was repeated using 23 g. N-(2-hydroxyethyl) 2-(4-aminophenoxy)acetamide. The yield of the blue dyestuff thereby obtained amounted to 17 g. This product evidenced a good build-up on Dacron in batch dyeing and exhibited minimal crocking and good sublimation fastness and good light fastness.

What is claimed is:

1. A quinizarin-4-aminophenoxy acetamide having the formula:

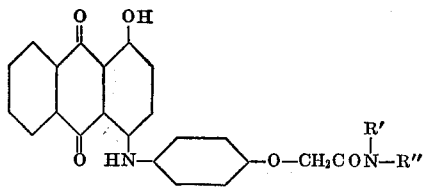

wherein R' is hydrogen, methyl, ethyl, butyl, or hydroxyethyl and R'' is hydrogen, methyl or ethyl.

2. A quinizarin-4-aminophenoxyacetamide according to claim 1 having the following formula:

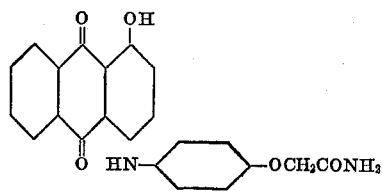

3. A quinizarin-4-aminophenoxyacetamide according to claim 1 having the following formula:

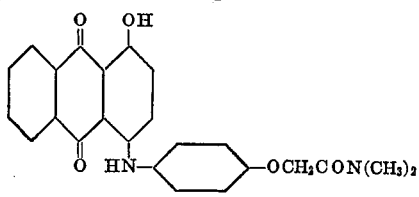

4. A quinizarin-4-aminophenoxyacetamide according to claim 1 having the following formula:

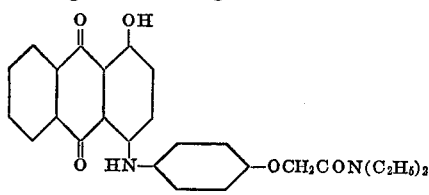

5. A quinizarin-4-aminophenoxyacetamide according to claim 1 having the following formula:

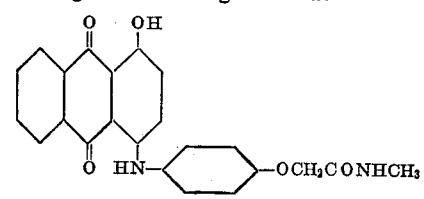

6. A quinizarin-4-aminophenoxyacetamide according to claim 1 having the following formula:

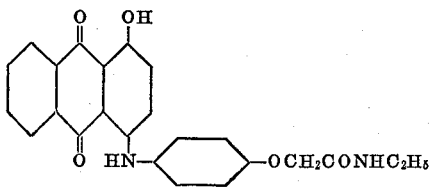

7. A quinizarin-4-aminophenoxyacetamide according to claim 1 having the following formula:

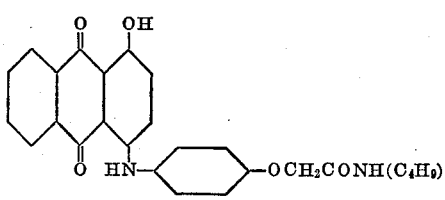

8. A quinizarin-4-aminophenoxyacetamide according to claim 1 having the following formula:

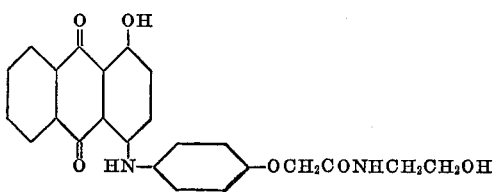

References Cited
FOREIGN PATENTS 1,184,375  3/1970  Great Britain _____ 260—377
855,541   9/1952  Germany _____ 260—377

LORRAINE A. WEINBERGER, Primary Examiner

E. J. SKELLY, Assistant Examiner

U.S. Cl. X.R.

8—39; 260—559 A, 559 B